United States Patent
Abdul et al.

(10) Patent No.: US 6,982,124 B2
(45) Date of Patent: Jan. 3, 2006

(54) YTTRIUM SUBSTITUTED BARIUM THIOALUMINATE PHOSPHOR MATERIALS

(75) Inventors: M. Nakua Abdul, Mississauga (CA); Dan Daeweon Cheong, Mississauga (CA)

(73) Assignee: IFire Technology Corp., Fort Saskatchewan (CA)

( * ) Notice: Subject to any disclaimer, the term of this patent is extended or adjusted under 35 U.S.C. 154(b) by 0 days.

(21) Appl. No.: 10/397,148

(22) Filed: Mar. 26, 2003

(65) Prior Publication Data

US 2003/0224221 A1 Dec. 4, 2003

Related U.S. Application Data

(60) Provisional application No. 60/367,510, filed on Mar. 27, 2002.

(51) Int. Cl.
*H05B 33/12* (2006.01)
(52) U.S. Cl. ............... 428/690; 428/917; 313/503; 313/506; 313/507; 252/301.4 S
(58) Field of Classification Search .......... 428/917, 428/690; 313/503, 506, 507; 252/301.4
See application file for complete search history.

(56) References Cited

U.S. PATENT DOCUMENTS

| 5,432,015 | A | 7/1995 | Wu et al. ............... 428/690 |
| 5,662,831 | A | 9/1997 | Chadha ............ 252/301.4 R |
| 5,939,825 | A * | 8/1999 | Sun et al. ............... 313/503 |
| 6,043,602 | A | 3/2000 | Sun et al. ............... 313/503 |
| 6,203,726 | B1 * | 3/2001 | Danielson et al. ..... 252/301.4 R |
| 6,447,654 | B1 * | 9/2002 | Kosyachkov .......... 204/192.15 |
| 2002/0180346 | A1 | 12/2002 | Cheong et al. |

FOREIGN PATENT DOCUMENTS

| EP | 1 148 111 A2 | 10/2001 |
| JP | 0724869 | 9/1995 |
| WO | WO021173 | * 2/2002 |

* cited by examiner

*Primary Examiner*—Rena Dye
*Assistant Examiner*—Camie S. Thompson
(74) *Attorney, Agent, or Firm*—Fay, Sharpe, Fagan, Minnich & McKee, LLP (57) ABSTRACT

A thin film phosphor for an electroluminescent device, the phosphor being selected from the group consisting of thiasluminates, thiogallates and thioindates having at least one cation selected from elements of Groups IIA and IIB of the Periodic Table of Elements. The phosphor being activated by a rare earth metal and containing a Group IIIB element as a partial substitute for a portion of aluminum, gallium or indium of the thiogallate, thioindate and thioaluminate. The phosphor provides improved luminance. An electroluminescent device consisting of the thin film phosphor on a substrate is also described.

43 Claims, 4 Drawing Sheets

YTTRIUM SUBSTITUTED BARIUM THIOALUMINATE PHOSPHOR MATERIALS

This application claims the benefit of Provisional Application No. 60/367,510, filed Mar. 27, 2002.

FIELD OF THE INVENTION

The present invention relates to phosphor materials which are used as thin films in electroluminescent displays. More specifically, the invention relates to yttrium substitution in such phosphor materials and in particular, yttrium substituted barium thioaluminate phosphor materials.

The invention also relates to improving the luminance of and optimizing the emission spectra of the phosphor materials when they are used for full color electroluminescent displays, particularly those employing thick film dielectric layers with a high dielectric constant.

BACKGROUND TO THE INVENTION

Thick film dielectric structures provide for superior resistance to dielectric breakdown, as well as a reduced operating voltage, compared to thin film electroluminescent (TFEL) displays e.g. as exemplified by U.S. Pat. No. 5,432,015. The thick film dielectric structure when it is deposited on a ceramic substrate will withstand higher processing temperatures than TFEL devices, which are typically fabricated on glass substrates. This increased high temperature tolerance facilitates annealing of phosphor films at higher temperatures to improve their luminosity. With these advantages and with recent advances in blue-emitting phosphor materials, displays have approached the luminosity and color coordinates required to achieve the technical performance of traditional cathode ray tube (CRT) displays. Nevertheless, further improvement in blue phosphor performance is required to simplify display design, to improve display reliability by lowering operating voltages and to keep pace with a trend towards higher color temperature specifications for displays.

Cerium-activated strontium sulphide phosphor materials have traditionally been used in electroluminescent displays for blue colors while manganese-activated zinc sulphide have been employed for red and green colors. The optical emission from these phosphor materials must be passed through an appropriate chromatic filter to achieve the necessary color coordinates for red, green and blue sub-pixels, resulting in a loss of luminance and energy efficiency. The manganese-activated zinc sulphide phosphor has a relatively high electrical to optical energy conversion efficiency of up to about 10 lumens per Watt of input power. Cerium-activated strontium sulphide phosphor has an energy conversion efficiency of 1 lumen per Watt, which is relatively high for blue emission. However, the spectral emission for these phosphors is quite wide, with spectral emission for the zinc sulphide-based phosphor material spanning the color spectrum from green to red and that for the strontium sulphide-based material spanning the range from blue to green. This necessitates the use of the optical filters. The spectral emission of the cerium-activated strontium sulphide phosphor can be shifted to some degree towards the blue by controlling the deposition conditions and activator concentration, but not to the extent required to eliminate the need for an optical filter.

Alternative blue phosphor materials having narrower emission spectra to provide the color coordinates required for a blue sub-pixel have also been developed. These phosphor materials include cerium-activated alkaline earth thiogallate compounds which provide good blue color coordinates, but exhibit relatively poor luminosity and stability. Higher luminosity and excellent color coordinates for blue pixels have been achieved with europium-activated barium thioaluminate phosphor materials.

More recently europium activated lanthanum thioaluminate has been shown to have utility as a blue light emitting electroluminescent phosphor. European Patent Application 1,148,111 discloses a thin film phosphor of this composition incorporated into a thick dielectric electroluminescent device for which a luminance of 300 candelas per m² was realized when a 1 kHz electric field was applied across the device. While this application suggests the use of yttrium as a possible choice of cation for thioaluminate based phosphor materials, it does not suggest a partial substitution of yttrium for any metallic species in the phosphor.

Yttrium has been used as a co-activator to enhance the luminosity of rare earth-activated sulphide phosphor materials in thin film electroluminescent devices. U.S. Pat. Nos. 6,043,602 and 5,939,825 teach the use of yttrium as one of a series of co-activator species that may enhance the luminance of green and blue light-emitting calcium, strontium, barium or magnesium sulfide phosphor materials. These phosphors also include a metal dopant such as copper or lead, and in the case of U.S. Pat. No. 6,043,602, a halogen selected from fluorine, chlorine or iodine. U.S. Pat. No. 5,662,831 teaches a method for the preparation of an europium activated yttrium oxy-sulfide material as a cathodoluminescent phosphor material. The phosphor is provided as a slurry further pulverized to attain small particle sizes. These aforementioned patents simply disclose yttrium as a dopant or co-dopant in a binary alkaline earth sulfide or alternatively, as the sole cation of the host material. These aforementioned patents do not teach or suggest the use of yttrium for controlled partial substitution of the metallic species of the phosphor.

There remains a need in the art for new phosphors having improved properties that have use as thin films in electroluminescent displays. The present invention fulfills this and other needs.

SUMMARY OF THE INVENTION

In accordance with an aspect of the present invention there is provided a thin film phosphor for an electroluminescent device, said phosphor being selected from the group consisting of thioaluminates, thiogallates and thioindates having at least one cation selected from elements of Groups IIA and IIB of the Periodic Table of Elements, said phosphor being activated by a rare earth metal and containing a Group IIIB element as a partial substitute for a portion of aluminum, gallium or indium of said thiogallate, thioindate and thioaluminate.

In accordance with another aspect of the present invention there is provided a thin film phosphor for an electroluminescent device, the phosphor being selected from the group consisting of thioaluminates, thiogallates and thioindates having at least one cation selected from elements of Groups IIA and IIB of the Periodic Table of Elements, said phosphor being activated by a rare earth metal and wherein a portion of the aluminum, gallium or indium of the thioaluminate, thiogallate or thioindate is replaced with yttrium.

According to another aspect of the present invention is a phosphor material having the formula:

$A_{1-w}D_w[Y_xZ_{1-x}]_yS_4$, wherein

A is a Group IIA or Group IIB cation;
D is a rare earth metal;
Z is selected from Al, Ga and In;
0<x<0.2;
y=2; and
0.005<w<0.1.

The invention provides for a partial substitution of yttrium for the metal species selected from aluminum, gallium and indium where such substitution does not substantially alter the crystal lattice structure of the phosphor.

In a preferred embodiment of the present invention, the phosphor is a thioaluminate.

In another embodiment, said rare earth metal is selected from europium and/or cerium, most preferably europium.

In another preferred embodiment, the cation is barium.

In further embodiments, the phosphor contains europium in an amount in the range of 1–10 atomic percent of the Group IIA or IIB cation present and yttrium in an amount in the range of about 0.1–20 atomic percent of the aluminum, gallium or indium. Preferably, the amount of europium is between about 2–7 atomic percent of the Group IIA or IIB cation present and yttrium replaces between about 1–7 atomic percent of the aluminum, gallium or indium content.

According to another aspect of the present invention is a phosphor material having the formula:

$A_{1-w}D_w[M_xZ_{1-x}]_yS_4$, wherein

A is a Group IIA or Group IIB cation;
D is a rare earth metal;
M is a Group IIIB metal selected from Y, Sc, La and Ac;
Z is selected from Al, Ga and In;
0<x<0.2;
y=2; and
0.005<w<0.1.

According to a further aspect of the present invention is an electroluminescent device comprising a thin film phosphor as described herein on a substrate structure.

According to still another aspect of the present invention is a method for making a phosphor material selected from the group consisting of thioaluminates, thiogallates and thioindates having at least one cation selected from elements of Groups IIA and IIB of the Periodic Table of Elements, said phosphor being activated by a rare earth metal and wherein a portion of the aluminum, gallium or indium is replaced with yttrium.

According to yet a further aspect of the present invention is a method for making a phosphor material having the formula:

$A_{1-w}D_w[Y_xZ_{1-x}]_yS_4$, wherein

A is a Group IIA or Group IIB cation;
D is a rare earth metal;
Z is selected from Al, Ga and In;
0<x<0.2;
y=2; and
0.005<w<0.1.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will be described with reference to the embodiments shown in the drawings, in which.

DETAILED DESCRIPTION OF THE INVENTION

The present invention relates to the partial replacement of aluminum, gallium or indium in a rare earth metal activated thioaluminate, thiogallate or thioindate phosphor with a group IIIB element wherein such partial replacement does not substantially distort or affect the crystal lattice structure of the phosphor material.

In one embodiment, the present invention relates to yttrium as a partial replacement for aluminum in europium activated alkaline earth thioaluminate phosphors, and especially to the incorporation of yttrium in such phosphors when they are deposited as thin films in electroluminescent displays. Such partial replacement provides several advantages with respect to the phosphor material and the electroluminescent display incorporating such phosphor material. In one aspect, the yttrium functions to lower the maximum temperature required in a heat treatment process (annealing) to form a preferred crystal phase. Furthermore, the luminescence of the phosphor composition is enhanced with the partial replacement or substitution of aluminum.

While it is desirable to partially replace aluminum with yttrium, it is within the scope of the present invention to partially replace aluminum, gallium or indium with yttrium or its related Group IIIB species which includes scandium, lanthanum and actinium so long as such substitution does not substantially distort or affect the crystal lattice structure of the phosphor in a manner that affects the function and properties of the phosphor.

In embodiments, and as exemplified herein, the electroluminance of europium-activated barium thioaluminate, a blue emitting phosphor, is increased by a factor of more than two when about three atomic percent of the aluminum is replaced with yttrium. There is a corresponding increase in the electrical to optical energy conversion efficiency of the device from less than 1 lumen per Watt without yttrium to 2 lumens per Watt with three atomic percent yttrium, a very high value for a blue emitting pixel. The optical emission spectrum is also shifted towards the blue with yttrium addition.

The present invention is particularly directed to use of a partially yttrium substituted and europium activated alkaline earth thioaluminate host material to form a phosphor. The invention is applicable to ternary, quaternary and higher thioaluminate, thiogallate and thioindate phosphors, and composites thereof synthesized with cation(s) for these compounds. Suitable cations are selected from Groups IIA and IIB of the Periodic Table of Elements which are known to those of skill in the art. Examples of such cations include barium, calcium, strontium, magnesium and zinc.

A variety of rare earth activators known to those of skill in the art may be used in the phosphor material in conjunction with substitute species, for example cerium and europium. The preferred activator used in conjunction with yttrium is europium. In preferred embodiments of the invention, are partially yttrium substituted barium thioaluminate ($BaAl_2S_4$) phosphors, which emit blue light.

Figure 1:
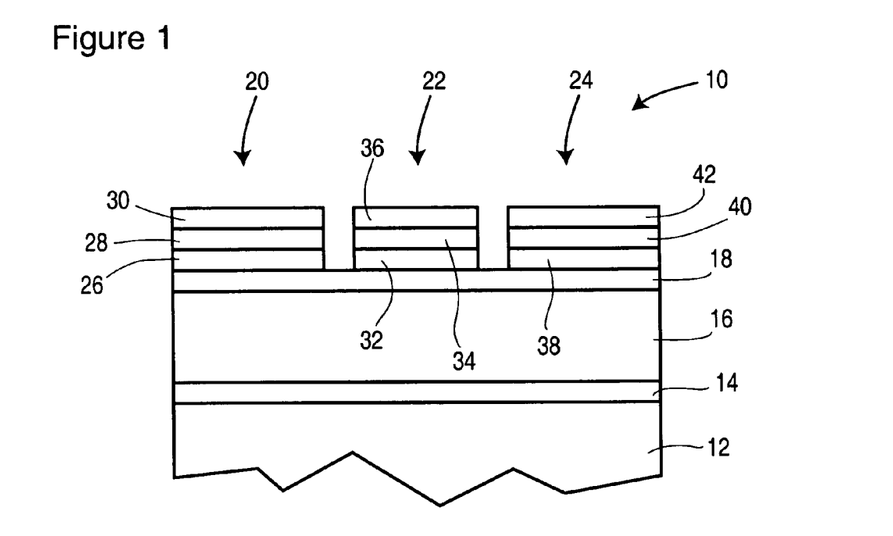
FIG. 1 is a schematic representation of a section of an electroluminescent element comprising a thick film dielectric layer and a phosphor composition typical of the present invention.
Figure 2:
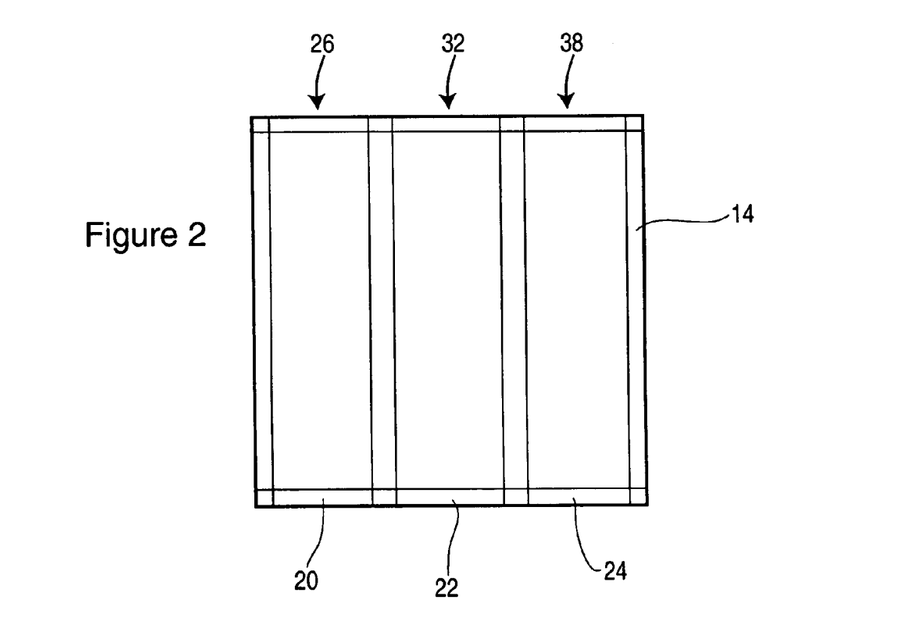
FIG. 2 is a schematic representation of a plan view of a full color electroluminescent pixel and its constituent subpixels.

The present invention is suited for use in an electroluminescent display or device shown in FIGS. 1 and 2. FIG. 1 shows a cross-section of an electroluminescent device utilizing a phosphor of the present invention. FIG. 2 shows a plan view of the electroluminescent device. The electroluminescent device, generally indicated by 10, has a base substrate 12 on which is located row electrode 14. Thick film dielectric 16 has thin film dielectric 18 thereon. Thin film dielectric 18 is shown with three pixel columns, referred to as 20, 22 and 24, located thereon. The pixel columns contain phosphors to provide the three basic colors viz. red, green and blue. Pixel column 20 has red phosphor 26 located in contact with thin film dielectric 18. Another thin film dielectric 28 is located on red phosphor 26, and column electrode 30 is located on thin film dielectric 28. Similarly, pixel column 22 has green phosphor 32 on thin film dielectric 18, with thin film dielectric 34 and column electrode 36 thereon. Pixel column 24 has blue phosphor 38 on thin film dielectric 18, with thin film dielectric 40 and column electrode 42 thereon.

The electroluminescent device of the present invention may incorporate a variety of substrate structures as will be understood by persons skilled in the art. In particular, the substrate structure comprises a thick film ceramic material having a base substrate which is a ceramic sheet having an electrically conductive film deposited thereon with a thick film layer deposited on the film. Examples of suitable base substrates are ceramic sheet materials that include but are not limited to alumina, metal ceramic composites, glass ceramic materials and high temperature glass materials. Suitable electrically conductive films are known to those of skill in the art such as, but not limited to, gold and silver alloy. The thick film layer comprises ferroelectric material. Suitable ferroelectric materials may be selected from lead magnesium niobate titanate, lead zirconate titanate, barium titanate and mixtures thereof. The thick film layer may also comprise one or more thin film layers thereon.

The deposition of the composition may be carried out in an atmosphere of $H_2S$, sulphur or other volatile sulphur bearing compounds that will not contaminate the phosphor film as it is deposited if there is a tendency for the deposited compound to be deficient in sulphur. In one embodiment, the deposition is done in a hydrogen sulphide atmosphere so that deposited species in the film can react with sulphide derived from the hydrogen sulphide to adequately saturate the deposited film with sulphide and achieve the desired film composition. However, in some instances, it may be possible to operate the method in a low pressure inert gas atmosphere without $H_2S$ Thus, a strict oxygen-free environment may not be necessary.

The deposition of the phosphor may be done using a variety of methods. For example, phosphor deposition can be done by electron beam evaporation, particularly dual source electron beam evaporation as exemplified in Applicant's co-pending U.S. patent application Ser. No. 09/747,315 filed Dec. 22, 2000 (the entirety of which is incorporated herein by reference). Deposition may also be carried out by dual source rf magnetron sputtering wherein there is a facility for injecting and exhausting gases including hydrogen sulphide. In this sputtering process the deposition substrate has a heating means and aluminum sulphide or metallic aluminum is present in one of the sputtering targets, the latter as exemplified in Applicant's U.S. patent application Ser. No. 09/867,080 filed May 29, 2001 (the entirety of which is incorporated herein by reference). Alternatively deposition can be conducted using thermal evaporation. One of skill in the art would readily comprehend how to deposit the phosphor of the present invention using different methods.

Alkaline earth thioaluminates have been reported to have utility as electroluminescent phosphors, but with low luminosity. It has now been demonstrated that improved control of the stoichiometry of the host material facilitates an electroluminescent element with higher luminance. It is presently demonstrated that the use of yttrium as a partial substitute for aluminum facilitates an electroluminescent element with still higher luminance than previously known phosphors.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

The examples are described for the purposes of illustration and are not intended to limit the scope of the invention.

Methods of chemistry, photochemistry and spectrometry referred to but not explicitly described in this disclosure and examples are reported in the scientific literature and are well known to those skilled in the art.

Example 1

A series of europium-doped magnesium barium yttrium thioaluminate powders were prepared by blending powders of barium sulphide, yttrium trisulphide, aluminum sulphide and europium sulphide in various ratios. The barium yttrium thioaluminate phosphor powders had the nominal composition $Ba_{0.97}Eu_{0.03}(Y_xAl_{1-x})_2S_4$. Samples were prepared with (i) x=0.0, (ii) x=0.05 and (iii) x=0.10

The blended powders were pressed to form pellets with a diameter of 1.3 cm and a height of 0.75 cm. The pellets were heat treated by placing them in an alumina boat and passing them through a belt furnace in a nitrogen environment with a peak temperature of about 950° C. for 10 minutes. The actual temperatures of the pellet may have been moderately lower due to the large thermal loading introduced by the alumina boat.

The photoluminescence and excitation spectra of the resultant phosphors were measured using a Model 814 photomultiplier detection system and an A-1010B Arc Lamp xenon flash lamp from Photon Technology International of London, Ontario, Canada. A monochromator was used to select the excitation wavelength.

Figure 3:
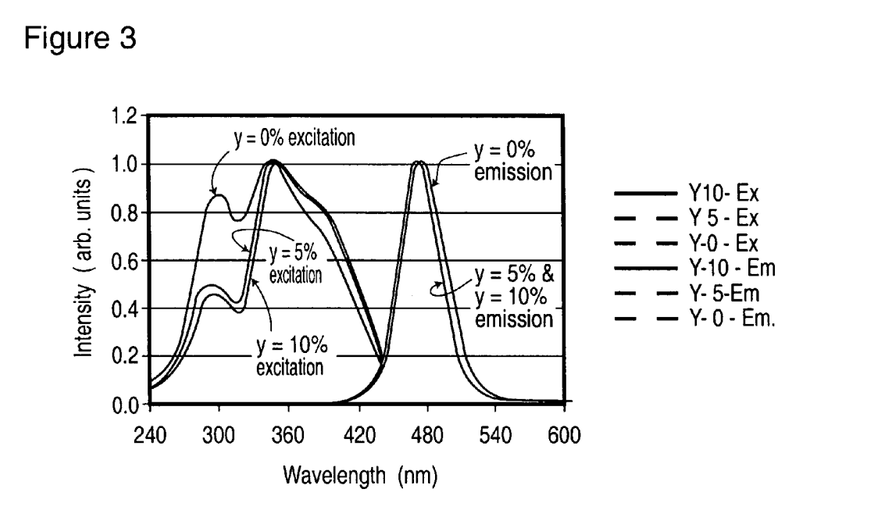
FIG. 3 is a graphical representation of photoexcitation and photoluminescence spectra for several barium yttrium thioaluminate powders doped with europium.

The photoluminescence and excitation spectra are shown in FIG. 3. The emission spectra have peaks near 480 nm, with a tendency for a shift to shorter wavelength at higher yttrium content. These spectra, especially the shorter wavelength ones, are capable of providing CIE coordinates suitable for full color displays with minimal filtering. The excitation spectra for the sample with no yttrium has two peaks, one near 300 nm and the other near 350 nm. The samples containing yttrium had excitation spectra with the 300 nm peak reduced in magnitude, but with the 350 nm peak essentially unchanged as compared to that of the sample containing no yttrium.

Example II

Figure 4:
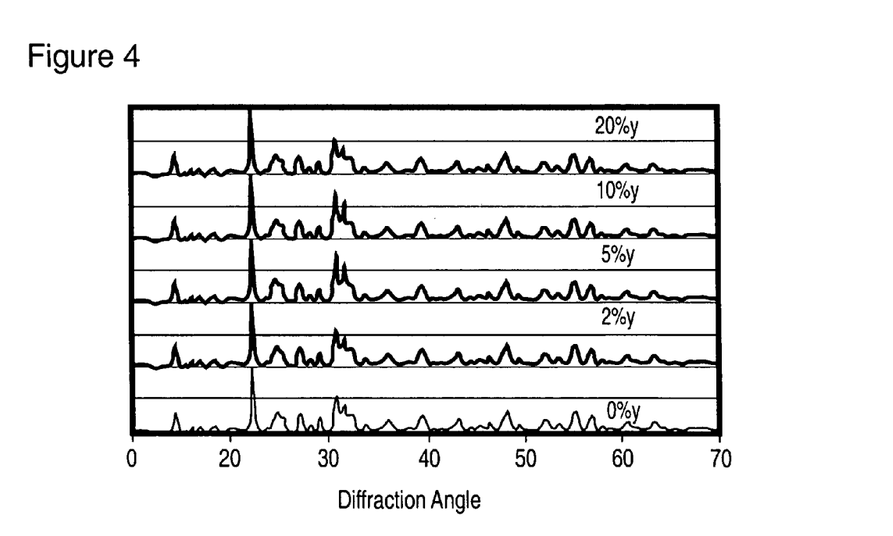
FIG. 4 is a graphical representation of x-ray diffraction patterns for several yttrium substituted barium thioaluminate phosphor materials.

A series of europium-doped magnesium barium yttrium thioaluminate powders were prepared by blending powders of barium sulphide, yttrium trisulphide, aluminum sulphide and europium sulphide in various ratios. The barium yttrium thioaluminate phosphor powders had the nominal composition $Ba_{0.97}Eu_{0.03}(Y_xAl_{1-x})_2S_4$. Samples were prepared with (i) x=0.0, (ii) x=0.02 (iii) x=0.05, (iv) x=0.10 and (v) x=0.20. The samples were fired in a belt furnace as in Example 1, except that the maximum temperature was about 1000° C. rather than about 950° C. Powder x-ray diffraction (XRD) patterns of the samples were obtained that could be indexed to the XRD pattern for cubic $BaAl_2S_4$. These patterns are shown in FIG. 4. The addition of yttrium caused the widths of the XRD peaks to become sharper, indicating a higher degree of crystallinity, a lower crystal defect density or a larger grain size for these materials. The angles for the peaks were unchanged, however, for the yttrium substituted materials, no substantial change in the crystal unit cell dimensions with yttrium substitution was indicated. For a yttrium content of x=0.1 or higher, however, additional XRD peaks appeared that may be barium sulfide, yttrium trisulfide or aluminum yttrium sulfide phases.

Example III

Two thick dielectric electroluminescent devices incorporating thin film phosphor layers comprising yttrium substituted barium thioaluminate activated with europium were constructed. The thick film substrate was comprised of a 5 cm by 5 cm alumina substrate having a thickness of 0.1 cm. A gold electrode was deposited on the substrate, followed with a thick film high dielectric constant dielectric layer in accordance with the methods exemplified in Applicant's co-pending international application. PCT CA00/00561 filed May 12, 2000. A thin film dielectric layer consisting of barium titanate, with a thickness of about 100–200 nanometers, was deposited on top of the thick film dielectric layer using the sol gel technique described in Applicant's co-pending U.S. patent application Ser. No. 09/761,971 filed Jan. 17, 2001 (the entirety of which is incorporated herein by reference).

The phosphor film was electron beam evaporated on top of the barium titanate layer using dual source electron beam evaporation, according to the methods described in Applicant's co-pending U.S. patent application Ser. No. 09/747, 315 filed Dec. 22, 2000 (the entirety of which is incorporated herein by reference). The two evaporation sources were aluminum sulphide and a fused mixture of barium sulphide and europium sulphide. For one of the devices, yttrium trisulphide was also added to the fused mixture in a quantity corresponding to x=0.05 in the formula $Ba_{0.97}Eu_{0.03}(Y_xAl_{1-x})_2S_4$. For both samples, each evaporation source was in the form of a pellet, which was prepared using the method outlined in Example I.

The phosphor deposition was carried out in a low pressure atmosphere of hydrogen sulphide at a pressure of about $8\times10^{-5}$ to about $2\times10^{-4}$ torr and with the substrate at a temperature in the range of about 350° C. to 500° C. The deposition was carried out by electron beam evaporation using the dual sources. The deposition rate of the aluminum sulphide, as measured in the absence of the remaining constituents using a quartz crystal monitor, was in the range of 5 to 7 Angstroms per second and the deposition rate of the remaining constituents in the absence of aluminum sulphide, also as measured using a quartz crystal monitor, was in the range of 3.5 to 5.5 Angstroms per second. The deposited phosphor film thickness was in the range 3000 to 4500 Angstroms.

Following deposition, the phosphor-coated substrates were annealed under a nitrogen atmosphere in a temperature of about 650° C. to 700° C. for about 2 minutes. A 50 nanometer thick alumina thin film and an indium tin oxide transparent conductor were deposited over the phosphor to provide a second electrode.

Figure 5:
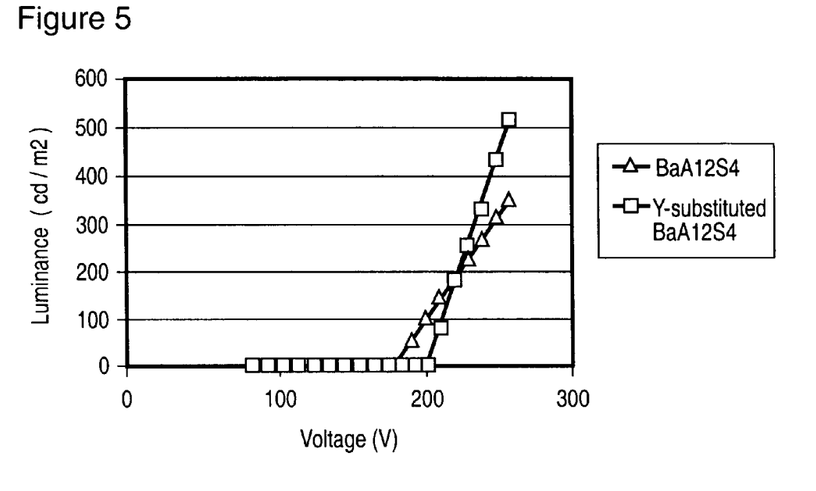
FIG. 5 is a graphical representation of luminosity as a function of applied voltage for similar electroluminescent devices having phosphor films with and without added yttrium.
Figure 6:
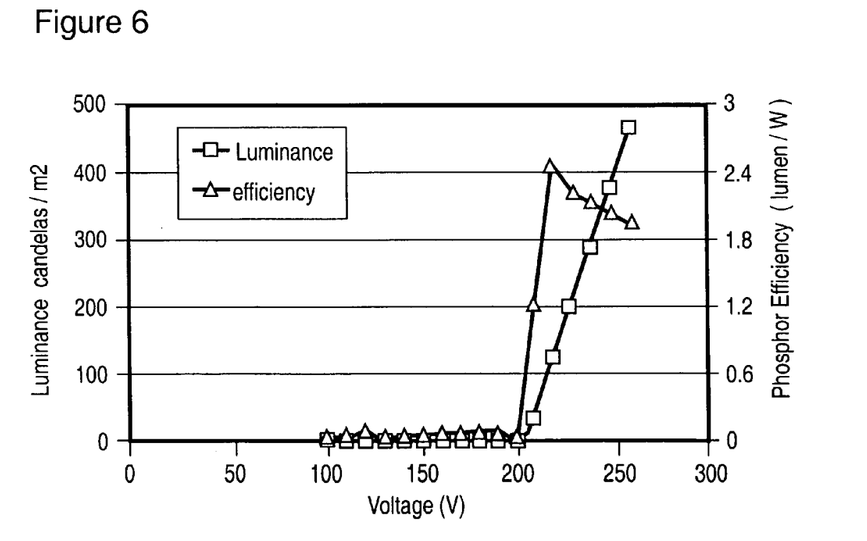
FIG. 6 is a graphical representation of the luminance and the phosphor efficiency of a electroluminescent device with a europium activated barium thioaluminate phosphor containing yttrium.

The resultant devices were tested using alternating polarity 32 microsecond wide square-wave pulses and a frequency of 120 Hz giving 240 light pulses per second. The pulse amplitude was varied in increments of 10 volts up to 260 volts and comparative data is shown in FIG. 5 for the two devices. As can be seen from FIG. 5, the luminance for the device with the phosphor containing yttrium is about twice that for the device not containing yttrium. The luminance increases linearly with the incremental voltage above the threshold voltage for the onset of luminance, and so the increased luminance with the yttrium additive can be realized without increasing the applied voltage. FIG. 6 also shows the phosphor efficiency for the device having a phosphor containing yttrium. A peak efficiency of 2.4 lumens per Watt is realized, a new record for blue phosphor luminance in this wavelength range.

Example IV

Figure 7:
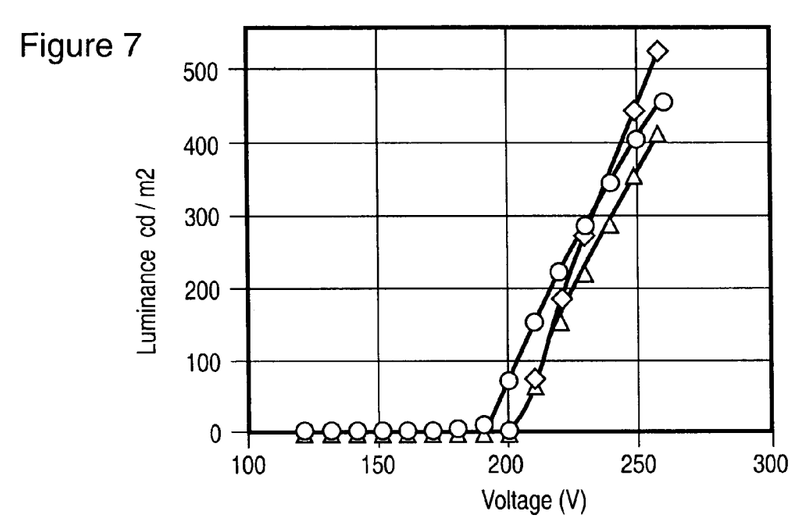
FIG. 7 is a graphical representation of luminosity as a function of applied voltage for several electroluminescent devices with a barium yttrium thioaluminate phosphor.

Several thick dielectric devices with phosphors containing containing yttrium at a concentration corresponding to x=0.05 were constructed and tested. FIG. 7 shows the dependence of the realized luminance as a function of the applied voltage. As can be seen from FIG. 7, the luminance performance of these devices were quite similar to one another, illustrating the repeatability of the device performance.

Example V

Figure 8:
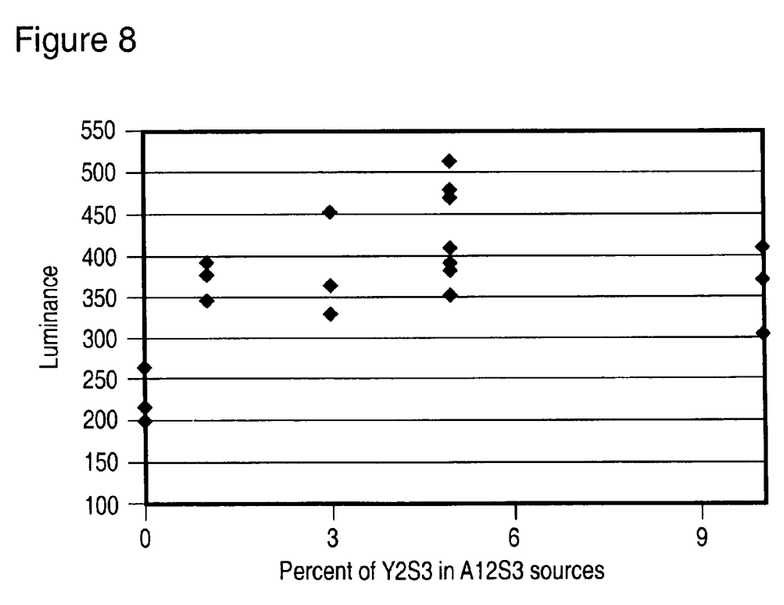
FIG. 8 is a graphical representation of the luminosity of electroluminesacent devices as a function of the yttrium concentration in the phosphor material.

Five more thick dielectric electroluminescent devices were constructed according to the methods of Example III, except that the yttrium concentration in the phosphor was varied. The first of the devices had a phosphor film with a europium concentration of about 3 atomic percent with respect to barium and a yttrium concentration of zero atomic percent with respect to aluminum. The second device had a phosphor film with a europium concentration of about 3 atomic percent with respect to barium and a yttrium concentration of about one atomic percent with respect to aluminum. The third device had a phosphor film with a europium concentration of about 3 atomic percent with respect to barium and a yttrium concentration of about 3 atomic percent with respect to aluminum. The fourth device had a phosphor film with europium concentration of about 3 atomic percent with respect to barium and a yttrium concentration of about 5 atomic percent with respect to aluminum. The fifth device had a phosphor film with a europium concentration of about 3 atomic percent with respect to barium and a yttrium concentration of about 10 atomic percent with respect to aluminum. The measured luminance for these devices is shown in FIG. 8 as a function of the yttrium concentration in the phosphor. The luminance is seen to increase as the value of x is increased.

Although preferred embodiments of the invention have been described herein in detail, it will be understood by those skilled in the art that variations may be made thereto without departing from the spirit of the invention.

What is claimed is:

1. A thin film phosphor for an electroluminescent device, said phosphor being a barium thioaluminate containing a rare earth metal activator and also containing yttrium as a partial substitute for a portion of aluminum of said thioaluminate, and wherein said phosphor contains said rare earth metal in an amount in the range of about 1–10 atomic percent of barium and yttrium is present in an amount in the range of about 0.1–20 atomic percent of aluminum.

2. The thin phosphor of claim 1, wherein said rare earth metal is selected from the group consisting of europium cerium.

3. The thin film phosphor of claim 2, wherein said rare earth metal is europium.

4. The thin film phosphor of claim 3, wherein said phosphor contains europium in an amount in the range of about 2–7 atomic percent of barium and yttrium is present in an amount in the range of about 1–7 atomic percent of aluminum.

5. The thin film phosphor of claim 1, wherein said phosphor is , wherein $0<x<1.0$.

6. An electroluminescent device comprising the thin film phosphor of claim 1 on a substrate structure.

7. The device of claim 6, wherein said substrate structure comprises a thick film ceramic material.

8. The device of claim 7, wherein said thick film ceramic material comprises a base substrate having an electrically conductive film deposited thereon and a thick film layer deposited on said electrically conductive film.

9. The device of claim 8, wherein said base substrate comprises a ceramic material selected from the group consisting of a ceramic sheet, a metal ceramic composite, a glass ceramic and a high temperature glass.

10. The device of claim 9, wherein said ceramic sheet is alumina.

11. The device of claim 10, wherein said electrically conductive thin film is selected from the group consisting of gold and silver alloy.

12. The device of claim 11, wherein said thick film layer comprises ferroelectric material.

13. The device of claim 12, wherein said ferroelectric material is selected from the group consisting of lead magnesium niobate titanate, lead zirconate titanate, barium titanate and mixtures thereof.

14. The device of claim 12, wherein said substrate structure additionally comprises one or more thin film dielectric layers on the thick film layer.

15. The device of claim 14, wherein said device additionally comprises a thin film dielectric layer on top of said thin-film phosphor.

16. A phosphor material having the formula:

$$A_{1-w}D_w[Y_xZ_{1-x}]_yS_4, \text{ wherein}$$

A is a Group IIA or Group IIB cation;
D is a rare earth metal;
Z is selected from Al, Ga and In;
$0<x<0.2$;
$y=2$; and
$0.005<w<0.1$.

17. The phosphor of claim 16, wherein Z is aluminum.

18. The phosphor of claim 16, wherein D is selected from the group consisting of europium and cerium.

19. The phosphor of claim 18, wherein said rare earth metal is europium.

20. The phosphor of claim 19, wherein said cation is barium.

21. The phosphor of claim 20, wherein said phosphor is $Ba_{0.97}Eu_{0.03}(Y_xAl_{1-x})_2S_4$, wherein $0<x<1.0$.

22. An electroluminescent device comprising a phosphor of claim 16 on a substrate structure.

23. The device of claim 22, wherein said substrate structure comprises a thick film ceramic material.

24. The device of claim 23, wherein said thick film ceramic material comprises a base substrate having an electrically conductive film deposited thereon and a thick film layer deposited on said electrically conductive film.

25. The device of claim 24, wherein said base substrate comprises a ceramic material selected from the group consisting of a ceramic sheet, a metal ceramic composite, a glass ceramic and a high temperature glass.

26. The device of claim 25, wherein said ceramic sheet is alumina.

27. The device of claim 26, wherein said electrically conductive thin film is selected from the group consisting of gold and silver alloy.

28. The device of claim 27, wherein said thick film layer comprises ferroelectric material.

29. The device of claim 28, wherein said ferroelectric material is selected from the group consisting lead magnesium niobate titanate, lead zirconate titanate, barium titanate and mixtures thereof.

30. The device of claim 28, wherein said substrate structure additionally comprises one or more thin film dielectric layers on the thick film layer.

31. The device of claim 30, wherein device additionally comprises a thin film dielectric layer on top of said thin-film phosphor.

32. A phosphor material having the formula:

$$A_{1-w}D_w[M_xZ_{1-x}]_yS_4, \text{ wherein}$$

A is a Group IIA or Group IIB cation;
D is a rare earth metal;
M is a Group IIIB metal selected from Y, Sc, La and Ac;
Z is selected from Al, Ga and In;
$0<x<0.2$;
$y=2$; and
$0.005<w<0.1$.

33. The phosphor of claim 32, wherein M is yttrium, A is barium, D is europium and Z is aluminum.

34. An electroluminescent device comprising the thin film phosphor of claim 32 on a substrate structure.

35. The device of claim 34, wherein said substrate structure comprises a thick film ceramic material.

36. The device of claim 35, wherein said thick film ceramic material comprises a base substrate having an electrically conductive film deposited thereon and a thick film layer deposited on said electrically conductive film.

37. The device of claim 36, wherein said base substrate comprises a ceramic material selected from the group consisting of a ceramic sheet, a metal ceramic composite, a glass ceramic and a high temperature glass.

38. The device of claim 37, wherein said ceramic sheet is alumina.

39. The device of claim 38, wherein said electrically conductive thin film is selected from the group consisting of gold and silver alloy.

40. The device of claim 39, wherein said thick film layer comprises ferroelectric material.

41. The device of claim 40, wherein said ferroelectric material is selected from the group consisting of lead magnesium niobate titanate, lead zirconate titanate, barium titanate and mixtures thereof.

42. The device of claim 36, wherein said substrate structure additionally comprises one or more thin film dielectric layers on the thick film layers.

43. The device of claim 42, wherein said device additionally comprises a thin film dielectric layer on top of said thin film phosphor.

* * * * *